United States Patent Office 3,476,829
Patented Nov. 4, 1969

3,476,829
HIGH IMPACT POLYSTYRENE COMPRISING A CROSS-LINKED BLEND OF POLYSTYRENE, A DIENE RUBBER AND A SOLUTION POLYMERIZED BLOCK COPOLYMER
Jerry T. Gruver and Clifford W. Childers, Bartlesville, Okla., assignors to Phillips Petroleum Company, a corporation of Delaware
No Drawing. Filed Jan. 5, 1966, Ser. No. 518,783
Int. Cl. C08f 33/02
U.S. Cl. 260—876       7 Claims

ABSTRACT OF THE DISCLOSURE

A high impact polystyrene composition is provided comprising polystyrene, a rubbery conjugated diene homopolymer and/or copolymer, from 0.5 to 25 weight percent of a solution polymerized block copolymer, said block copolymer having from 50 to 98 weight percent monovinyl substituted aromatic compound, and a peroxy-containing material. The separately-prepared components are blended and then cross-linked by heating to decompose the peroxy-containing material.

---

This invention relates to a method for making polystyrene compositions with improved properties and the compositions thereof.

Heretofore certain properties, such as impact strength, of polystyrene have been improved by adding thereto certain rubbery components, e.g. rubbery copolymers of butadiene and styrene, and then crosslinking the resulting composition by decomposing a peroxy oxygen-containing compound in intimate mixture therewith.

Quite surprisingly, it has now been found that polystyrene compositions which are even more improved as to certain physical properties are obtained by replacing a portion of the polystyrene or rubbery (elastomeric component or both with at least one solution polymerized block copolymer formed from a conjugated diene and a monovinyl substituted aromatic and containing from about 50 to about 98, preferably from about 70 to about 90, weight percent vinyl aromatic compound based on the total amount of monomers used in preparing the block copolymer.

Accordingly, it is an object of this invention to provide a new and improved method for producing improved polystyrene compositions. It is another object of this invention to provide a new and improved polystyrene composition.

Other aspects, objects, and the several advantages of this invention will be apparent to those skilled in the art from the description and appended claims.

According to this invention, there is provided a method of making polystyrene compositions which contain polystyrene in the range of from about 40 to about 95, preferably from about 60 to about 90, weight percent, a rubbery conjugated diene homopolymer and/or copolymer in the range of from about 4.5 to about 39.5, preferably from about 9 to about 30, weight percent, and the above-described high styrene, block copolymer in the range of from about 0.5 to about 25, preferably from about 1 to about 20, weight percent, all weight percents being based on the total weight of the polymeric components in the composition. These three separate polymers are formed into a blend together with a peroxy oxygen containing material. The blend is then subjected to heating either during blending or after blending or both, at a temperature at or above that which causes decomposition of the peroxy oxygen containing compound.

The quantities of the three polymers in the blend are also adjusted depending upon the specific polymers employed to provide a final composition in which the rubber content is in the range of from about 5 to about 40, preferably from about 8 to about 35, weight percent based on the total weight of the polymeric components in the final composition. By the term "rubber content" is meant the total amount of the rubbery homopolymer and/or copolymer and the amount of conjugated diene present in the block copolymer that contains from about 50 to about 98 weight percent monovinyl substituted aromatic compound.

Generally, any commercially available, general purpose polystyrene can be employed in the practice of this invention. The rubbery homopolymers and random copolymers which can be blended with polystyrene can be prepared by any of the known methods used for the manufacture of synthetic rubber. The rubbery or high styrene block copolymers are formed by a solution polymerization technique. The block structure is characterized in that the molecules of the final polymer product are composed of contiguous blocks, or segments, of different polymeric types, for example, one of the blocks forming the polymer chain can be a homopolymer of a conjugated diene or a copolymer of a conjugated diene and a monovinyl substituted aromatic compound while an adjacent block in that same chain can be a homopolymer of a monovinyl aromatic compound or a copolymer of a monovinyl aromatic compound and a conjugated diene. It should be noted that one or more conjugated dienes or monovinyl aromatic copolymer blocks can be present in the block copolymers used in the compositions of this invention.

The second polymeric component is a rubbery conjugated diene homopolymer or copolymer prepared by any conventional method such as by solution polymerization, emulsion polymerization, mass (bulk) polymerization, and the like. The copolymer includes random or block copolymers. They can be linear or branched and can contain 2 or more blocks, depending upon their method of preparation. This rubbery polymer will contain from about 65 to about 100 weight percent of conjugated diene based on the total weight of the rubbery polymer. When this rubbery polymer is a block copolymer the monovinyl aromatic block is resinous and will contain from about 90 to about 50 to about 100 weight percent conjugated diene, in that block. The conjugated diene block of this rubbery block copolymer will contain from about 50 to about 100 weight percent conjugated diene in that block.

The third polymeric component is the high styrene block copolymer containing from about 50 to about 98, preferably from about 70 to about 90, weight percent vinyl aromatic compound based on the total monomers. The monovinyl aromatic block of this copolymer is resinous and contains from about 90 to about 100 weight percent monovinyl substituted aromatic compound while the conjugated diene block of this copolymer contains from about 50 toa bout 100 weight percent conjugated diene, both weight percents being based upon 100 parts by weight of monomers in each block.

The amount of homopolymer of monovinyl substituted aromatic compound present in a particular block copolymer can be determined by the oxidative degradation test which is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from a random copolymer block are soluble in ethyl alcohol whereas the unattacked high molecular weight polystyrene from the styrene homopolymer block is insoluble in ethyl alcohol. It is thus possible to effect a separation of the high molecular weight polystyrene which constitutes the homopolymer block of the block copolymer.

The conjugate dienes that can be employed in preparing the copolymers applicable to this invention are those containing from 4 to 10 carbon atoms per molecule, for example, 1,3-butadiene, isoprene, 1,3-pentadiene (piperylene), 1,3-hexadiene, 2,3-dimethyl-1,3-butadiene, 1,3-octadiene, 4-ethyl-1,3-hexadiene, 4-phenyl-1,3-butadiene, and the like. Preferred conjugated dienes are butadiene, isoprene, and piperylene.

Monovinyl substituted aromatic compounds that can be employed for preparing the copolymers of this invention are those containing from 8 to 12 carbon atoms per molecule, for example, styrene, 3-methylstyrene, 4-methylstyrene, 4-isopropylstyrene, 2,4-dimethylstyrene, 1-vinylnaphthalene, 2-vinylnaphthalene, and the like.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic, paraffinic and cycloparaffinic hydrocarbons. The polymerization is generally carried out at a temperature within the range of from about −20 to about 150, preferably from about −10 to about 80° C. and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds used correspond to the formula $R(Li)_x$, wherein R is a hydrocarbon radical selected from the group consisting of aliphatic, cycloaliphatic and aromatic radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,4-dilithionaphthalene, 1,2-dilithio-1,3-diphenylethane, 9,10-dilithio-9,10-dihydroanthracene, 1,2-dilithio-1,3-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexane, and the like.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Block copolymers prepared by using an organomonolithium initiator can be treated with a polyfunctional agent to terminate the polymerization and couple together two or more block copolymers.

Suitable methods of making block copolymers can be found in U.S. Patent 3,030,346, the disclosure of which is incorporated herein by reference. Other suitable methods of making block copolymers as well as random copolymers utilizable in this invention are found in U.S. Patent 2,975,160, the disclosure of which is incorporated herein by reference.

Homopolymers of conjugated dienes can be made in a manner known to the art using the above-described catalysts, diluents, and the like. The homopolymers can be formed by emulsion or solution techniques. Suitable methods for making these homopolymers are found in British Patent 817,693, and Journal of Polymer Science, volume 41, pages 381 through 397, 1959, the disclosures of which are incorporated herein by reference.

At the completion of the above polymerization reactions the reaction mixture is inactivated by the addition of one or more conventional catalyst-inactivating materials such as water, alcohols, organic and inorganic acids, and the like. Also, suitable additives such as antioxidants, stabilizers, pigments and the like can be added to the copolymer product.

The peroxy compounds which can be employed in this invention include organic and inorganic peroxides. The term "organic peroxides" is meant to include the hydroperoxides, unless otherwise stated, and to encompass compounds containing from 4 to 40 carbon atoms per molecule, inclusive. The organic perovides can also be substituted with non-peroxy members such as halogen, hydroxy radicals, ether and/or ester linkages, and the like. The organic peroxides include calcium peroxide, barium peroxide. zinc peroxide, lead peroxide, and mixtures thereof.

Examples of suitable peroxides include:

methyl n-propyl peroxide,
diethyl peroxide,
ethyl isopropyl peroxide,
di-tert-butyl peroxide,
di-n-hexyl peroxide,
n-hexyl n-decyl peroxide,
dieicosyl peroxide,
dicyclohexyl peroxide,
dicyclopentyl peroxide,
bis(2,4,6-trimethylcyclohexyl) peroxide,
bis(3,5-dichlorocyclohexyl) peroxide,
bis(4-phenylcyclohexyl) peroxide,
bis(2-cyclohexenyl) peroxide,
bis(4-methyl-2-hexenyl) peroxide,
bis(4-octenyl) peroxide,
dipropionyl peroxide,
dilauroyl peroxide,
dibenzoyl peroxide,
dicrotonyl peroxide,
dibenzyl peroxide,
dicumyl peroxide,
methyl 2-n-propyl-3-butenyl peroxide,
bis(alpha-ethylbenzyl) peroxide,
bis[diisopropyl-(4-isopropylphenyl)methyl] peroxide,
bis[dimethyl-(4-tert-butylphenyl)methyl] peroxide,
benzyl alpha-methylbenzyl peroxide,
bis(4-chlorobenbenzoyl) peroxide, bis(2,4-dichlorobenzoyl) peroxide,
bis(2-propoxy-n-hexyl) peroxide,
n-pentyl 5,8-diphenyldodecyl peroxide,
bis(9,10-dihydroxydecyl) peroxide,
2,5-di-(tert-butylperoxy)2,5-dimethylhexane,
bis(2-hydroxyheptyl) peroxide,
tert-butyl hydroperoxide,
dodecyl hydroperoxide,
eicosyl hydroperoxide,
triacontanyl hydroperoxide,
4-methylcyclohexyl hydroperoxide,
phenylcyclohexane hydroperoxide,
3-cyclohexenyl hydroperoxide,
3-phenyl-2-cyclohexenyl hydroperoxide,
4-cyclopentyl-n-butyl hydroperoxide,
cumene hydroperoxide (dimethylphenylhydroperoxymethane),
disopropylbenzene hydroperoxide [dimethyl-(4-isopropylphenyl)-hydroperoxymethane],
(4-ethoxyphenyl)methyl hydroperoxide,
di-n-hexyl-4-hydroxyphenylhydroperoxymethane,
dimethyl(3-methoxyphenyl)hydroxyperoxymethane,
peroxybenzoic acid,
peroxybutyric acid,
peroxydodecanoic acid,
tert-butyl peroxybenzoate,
di-tert-amyl diperoxyphthalate, and
tert-dodecylperoxyacetate.

Peroxides formed by the oxidation of terpene hydrocarbons such as pinane, alpha-pinene, p-menthane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from bout 0.35 to about 4.5, gram millipoles of peroxy oxygen (—O—O—) per 100 grams of conjugated diene in the above described copolymer or copolymers.

The polystyrene, rubbery polymer, high styrene block copolymer, and peroxy compound or compounds can be mixed or blended in any conventional manner, a primary desired result being an intimate mixture of the components. It is presently preferred that the mixing, when the peroxy compound is present, be carried out in the substantial absence of air in order to effect maximum property improvement. However, it does not appear at present to be mandatory that substantially all air be excluded, for example, satisfactory results can be obtained by Banbury mixing if the Banbury is merely substantially full. Generally, any internal mixer such as a Banbury, twin screw extruder, Brabender Plastograph, and the like can be employed. Mixing in a vacuum or an inert atmosphere such as nitrogen can also be advantageously employed in this invention. It should be noted that various blending techniques can be employed, e.g. blending only a portion of one or more components, preferably all the rubber components and a portion of the polystyrene, in a first mixing cycle and then adding the remainder of those one or more components, such as the remainder of the polystyrene, for additional mixing in a special cycle.

Although the mixing temperature when the peroxy compound is present in the mix is that sufficient to substantially decompose the peroxy compound, in general, the mixing temperature will most times fall in the range of from about 250 to about 600, preferably from about 300 to about 500° F. The mixing time, as with the mixing temperature, can vary widely but will generally be in the range of from about 1 to about 30, preferably from about 2 to about 15 minutes. The blend can also be heated to similar temperatures after mixing is terminated or the heating operation can overlap the mixing period and the period following the termination of the mixing operation.

The blends of this invention can also contain other ingredients normally included in such compounds. For example, atioxidants, pigments, dyes, fillers, stabilizers, plasticizers, and the like can be included in these blends.

It should be noted that the properties of the compositions of this invention can be varied by changing the ratios of various components. Tensile strength can generally be improved by decreasing the total rubber content of the compositions. An increase in rubber content generally improves the impact strength and elongation of the compositions. Also, the properties of the compositions can be varied by changing the ratios of vinyl substituted aromatic compound to conjugated diene in the block copolymer that contains from about 50 to about 98 weight percent monovinyl substituted aromatic compound.

EXAMPLE I

High impact polystyrene compositions having high tensile strength and high elongation were prepared by blending a heat and light stabilized, general purpose polystyrene ("Stayron" 673, a trademark of and manufactured by the Dow Chemical Company), a rubbery 75/25 butadiene/styrene block copolymer, and an 88/12 styrene/butadiene block copolymer, and thereafter adding bis-($\alpha,\alpha$-dimethylbenzyl) peroxide to effect crosslinking of the elastomeric portions of the block copolymers. Blending was conducted in an an internal mixer (Brabender Plastograph). The chamber was flushed with nitrogen and polystyrene was introduced and mixed at slow speed until it fluxed. The block copolymers were added and fluxed 3 minutes under nitrogen with the mixer operating at 100 r.p.m. The peroxide was then added, the vacuum head was closed, and the chamber was evacuated. Mixing was continued at 100 r.p.m. for 7 minutes. The initial mixing temperature was about 310° F. and the final mixing temperature was about 340° F.

The 88/12 styrene/butadiene block copolymer employed in the compositions was prepared in accordance with the following recipe:

| | |
|---|---:|
| 1,3-butadiene, parts by weight | 12 |
| Styrene, parts by weight | 88 |
| Cyclohexane, parts by weight | 1000 |
| n-Butyllithium, mhm.[1] | 1.05 |
| Temperature, ° F. | 158 |
| Time, hours | 18 |
| Total monomer conversion, percent | 100 |

[1] Mhm.=gram millimoles per 100 grams of monomers.

All recipe ingredients were charged initially. The polymerization was conducted in an atmosphere of nitrogen. At the conclusion of the polymerization, the reaction was shortstopped with an isopropyl alcohol solution containing one part by weight per 100 weight parts polymer of tris-nonylphenyl phosphite and two parts by weight per 100 weight parts polymer of thio-bis phenol. The polymer was coagulated in isopropyl alcohol, separated, and dried.

The rubbery 75/25 butadiene/styrene block copolymer was prepared in n-hexane diluent using 2.6 grams millimoles of n-butyllithium per 100 grams of monomer as the initiator. All ingredients were charged initially. Polymerization was initiated at about 150° F. and the temperature increased to about 220° F. during the reaction. On completion of the polymerization, one part by weight per 100 parts rubber of a mixture of $C_{16}$ to $C_{18}$ saturated and unsaturated fatty acids was added to inactivate the catalyst and one part by weight per 100 weight parts rubber of 2,6-di-tert-butyl-4-methylphenol was added as antioxidant. The mixture was steam stripped and the wet rubber crumb was washed and dried. The copolymer had a Mooney value (ML–4 at 212° F.) of about 47.

After removing the blends from the mixer, they were compression molded at 350° F. into sheets 1/16 inch in thickness. The sheets were cut into ½-inch strips from which dog bone specimens were machined. A 2-inch gage length was used for the test specimens and the width in the gage length area was ¼ inch. Tensile strength and elongation were measured at a drawing rate of 0.2 inch per minute. Izod impact strength was also measured. The quantity of bis($\alpha,\alpha$-dimethylbenzyl)peroxide used in each composition was 0.1 weight percent based on the total weight of the polymeric components in the blend. The quantities of polymeric materials used in each blend and physical properties of the compositions were as follows:

|  | Control | 1 | 2 | 3 | 4 |
|---|---|---|---|---|---|
| Polystyrene, parts by weight [1] | 75 | 74 | 71 | 68 | 61 |
| 75/25 butadiene/styrene block copolymer, parts by weight [1] (rubber) | 25 | 25 | 24 | 23.5 | 22 |
| 88/12 styrene/butadiene block copolymer, parts by weight [1] | 0 | 1 | 5 | 8.5 | 17 |
| Conjugated diene in 88/12 styrene/butadiene copolymer, parts by weight |  | 0.1 | 0.6 | 1.0 | 2.0 |
| Rubber content of composition, wt. percent [1] | 25 | 25.1 | 24.6 | 24.5 | 24.0 |
| Gram mmoles peroxy oxygen per 100 grams rubber in composition | 1.48 | 1.48 | 1.52 | 1.52 | 1.56 |
| Tensile, p.s.i. | 2,870 | 3,320 | 3,600 | 3,610 | 3,770 |
| Elongation, percent | 22 | 38 | 82 | 75 | 63 |
| Notched Izod impact, ft.-lbs./in. | 2.9 | 3.5 | 5.3 | 5.4 | 5.8 |

[1] All parts by weight and weight percent based on the total weight of the polymeric components in the composition.

In runs 1 through 4, prepared according to the invention, all products had higher impact strength, higher tensile strength, and higher elongation than the product from control run in which no high-styrene block copolymer was employed.

EXAMPLE II

The procedure of Example I was followed except that a rubbery linear 75/25 butadiene/styrene random copolymer, prepared by solution polymerization, was used instead of the 75/25 butadiene/styrene block copolymer. In another run a butadiene/styrene emulsion copolymer was employed.

The linear butadiene/styrene random copolymer was prepared using a 75/25 weight ratio of butadiene to styrene. Polymerization was conducted in the presence of n-hexane as the diluent, 0.75 gram millimoles of n-butyllithium per 100 grams of monomers as the catalyst, and tetrahydrofuran as the randomizing agent, all ingredients being charged initially. On completion of the polymerization, one part by weight per 100 parts rubber of a mixture of $C_{16}$ to $C_{18}$ saturated and unsaturated fatty acids was added to inactivate the catalyst and one part by weight per 100 parts rubber of 2,6-di-tert-butyl-4-methylphenol was added as antioxidant. The mixture was steam stripped and the wet rubber crumb was washed and dried. The copolymer had a Mooney value (ML–4 at 212° F.) of about 58.

The emulsion copolymer was prepared at 41° F. using a rosin acid soap as the emulsifier. The polymer was coagulated by the salt-acid technique. It had a bound styrene content of 23.5 weight percent and a Mooney value (ML–4 at 212° F.) of about 52. This polymer was prepared according to recipe ASTM D1419–61T, type 1500.

The quantity of bis($\alpha,\alpha$-dimethyl benzyl)peroxide used in each composition was 0.1 weight percent based on the total weight of the polymeric components in the blend. The quantities of polymeric material used in each blend and physical properties of the compositions were as follows:

|  | Control | 1 | 2 | 3 |
|---|---|---|---|---|
| Polystyrene, parts by weight [1] | 75 | 68 | 61 | 75 |
| 75/25 butadiene/styrene random copolymer, parts by weight [1] (rubber) | 25 | 23.5 | 22 |  |
| Butadiene/styrene emulsion copolymer, parts by weight [1] (rubber) |  |  |  | 18.8 |
| 88/12 styrene/butadiene block copolymer, parts by weight [1] |  | 8.5 | 17 | 6.2 |
| Conjugated diene in 88/12 styrene/butadiene block copolymer, parts by weight |  | 1.0 | 2.0 | 0.7 |
| Rubber content of composition, wt. percent [1] | 25 | 24.5 | 24.0 | 19.5 |
| Gram mmoles peroxy oxygen per 100 grams rubber in composition | 1.48 | 1.52 | 1.56 | 1.88 |
| Tensile, p.s.i. | 2,910 | 3,620 | 3,640 | 4,390 |
| Elongation, percent | 12 | 83 | 100 | 30 |
| Notched Izod impact, ft.-lbs./in. | 2.0 | 6.1 | 6.6 | 6.3 |

[1] See footnote 1 in table of Example I.

These data show that the rubbery random copolymer and the rubbery emulsion copolymer, when used in compositions prepared according to the invention, gave products with higher impact strength, higher tensile strength, and higher elongation than was obtained in the control composition from run 1 in which no high-styrene block copolymer was employed.

EXAMPLE III

High impact polystyrene compositions were prepared according to this invention by blending a general purpose polystyrene (Cosden 550, manufactured by Cosden Oil and Chemical Company), a rubbery 75/25 butadiene/styrene block copolymer, and high styrene containing block copolymers wherein the amount of styrene employed was varied, and thereafter adding 2,5-bis-tert-butylperoxy)-2,5-dimethylhexane (obtained as a 50 percent active material sold under the trade name of "Varox" and manufactured by R. T. Vanderbilt Company) to effect crosslinking of the elastomeric portions of the block copolymers.

Blending was effected in the same manner as set forth in Example I except that the maximum mixing temperature was in the range of from 347 to 365° F. The high styrene block copolymers had styrene/butadiene weight ratios of 50/50, 75/25, and 90/10. These copolymers were prepared according to the method described in Example I for preparing the rubbery 75/25 butadiene/styrene block copolymer except that the catalyst level was 0.08 gram millimoles, instead of 2.6 gram millimoles, of n-butyllithium per 100 grams of monomers.

The rubbery 75/25 butadiene/styrene block copolymer was prepared in the same manner as that set forth in Example I using a butyllithium level of 2.6 gram millimoles per 100 grams of monomers.

Samples were made using each of the above three high styrene block copolymers and were tested in the same manner as described above in Example I. The results of these tests were as follows:

|  | 1 | 2 | 3 |
|---|---|---|---|
| Polystyrene, parts by weight | 71.3 | 71.0 | 70.7 |
| 75/25 butadiene/styrene block copolymer (rubber), parts by weight [1] | 19.7 | 23.0 | 24.3 |
| 50/50 styrene/butadiene block copolymer, parts by weight [1] | 9.0 | | |
| 75/25 styrene/butadiene block copolymer, parts by weight [1] | | 6.0 | |
| 90/10 styrene/butadiene block copolymer, parts by weight [1] | | | 5.0 |
| Conjugated diene in high styrene block copolymers, parts by weight | 4.5 | 1.5 | 0.5 |
| Rubber content of composition, wt. percent [1] | 24.2 | 24.5 | 24.8 |
| Varox, wt. percent (based on the total weight of the polymeric components in the composition) [2] | 0.07 | 0.07 | 0.07 |
| Gram mmoles peroxy oxygen per 100 grams rubber in total composition | 2 | 2 | 2 |
| Tensile, p.s.i. | 3,140 | 3,380 | 3,440 |
| Elongation, percent | 35 | 55 | 47 |
| Notched Izod impact, ft.-lbs./in | 6.9 | 5.7 | 5.8 |

[1] See footnote 1 in table of Example I.
[2] Obtained as a 50 weight percent active material; amount in table is active material.

These data show that all the products had high impact strength, high tensile strength, and high elongation.

EXAMPLE IV

High impact polystyrene compositions were prepared by blending general purpose polystyrene (Cosden 550, manufactured by Cosden Oil and Chemical Company), rubbery polybutadiene, and an 88/12 styrene/butadiene block copolymer and thereafter adding 2,5-bis(tert-butylperoxy)-2,5-dimethylhexane (obtained as a 50 weight percent active material and under the trade name of "Varox" and manufactured by R. T. Vanderbilt Company) to effect crosslinking of the elastomeric portions of the homopolymer and block copolymer.

Blending was carried out in the same manner as disclosed in Example I.

The 88/12 butadiene/styrene block copolymer was formed in the same manner and with the same recipe as set forth in Example I.

The rubbery homopolymer of butadiene was prepared in n-hexane diluent using 1.7 gram millimoles per 100 grams of monomers of n-butyllithium as the initiator. All ingredients were charged initially. Polymerization was carried out at about 220° F., and on completion one part by weight per 100 weight parts rubber of a mixture of $C_{16}$ to $C_{18}$ saturated and unsaturated fatty acids was added to inactivate the catalyst and one part by weight per 100 parts rubber of 2,6-di-tert-butyl-4-methylphenol was added as antioxidant. The mixture was steam stripped and the wet rubber crumb was washed and dried. The resulting rubber had a Mooney value (ML–4 at 212° F.) of 55.

The blend of polystyrene, polybutadiene, and block copolymer was formed into samples and tested in the same manner as Example I. The results were as follows:

|  | 1 | 2 |
|---|---|---|
| Polystyrene, parts by weight [1] | 81.25 | 75.75 |
| Polybutadiene rubber, parts by weight [1] | 18.75 | 18 |
| 88/12 styrene/butadiene block copolymer, parts by weight [1] | | 6.25 |
| Conjugated diene in 88/12 styrene/butadiene block copolymer, parts by weight | | 0.75 |
| Rubber content of composition, wt. percent [1] | 18.75 | 18.75 |
| Varox, wt. percent,[2] based on total weight of the polymeric components in the composition | 0.07 | 0.07 |
| Gram mmoles peroxy oxygen per 100 grams rubber in total composition | 2.5 | 2.5 |
| Tensile, p.s.i. | 3,460 | 3,720 |
| Elongation, percent | 6 | 25 |
| Notched Izod impact, ft.-lbs./in | 1.2 | 4.4 |

[1] See footnote 1 in table of Example I.
[2] Obtained as a 50 weight percent active material; amount in table is active material.

These data show that the composition containing the polybutadiene 88/12 styrene/butadiene block copolymer combination had a higher tensile strength, higher elongation, and higher impact strength than the composition in which the block copolymer was eliminated.

Reasonable variations and modifications are possible within the scope of this disclosure without departing from the spirit and scope thereof.

We claim:
1. A method of making a polystyrene composition of improved properties comprising forming a blend, based on the total weight of the polymeric components, of (1) about 40 to about 95 weight percent polystyrene, (2) about 4.5 to about 39.5 weight percent of at least one rubbery polymer selected from the group consisting of: homopolymers of a conjugated diene; and copolymers of at least 65 weight percent of at least one conjugated diene and at least one monovinyl substituted aromatic hydrocarbon compound, (3) about 0.5 to 25 weight percent of at least one solution polymerized block copolymer formed from at least one conjugated diene and at least one monovinyl substituted aromatic hydrocarbon compound, said block copolymer containing from about 50 to about 98 weight percent monovinyl substituted aromatic compound based on the total weight of monomers used in preparing the block copolymer, and a peroxy oxygen containing material thereby causing cross-linking to occur, and subjecting said blend to a temperature sufficient to decompose the peroxy oxygen containing material, said components (1), (2), and (3) being separately prepared prior to said blending.

2. A method according to claim 1 wherein said rubbery polymer contains from about 65 to about 100 weight percent conjugated diene based on the total weight of monomers used in preparing the rubbery polymer.

3. The method according to claim 1 wherein from about 0.25 to about 6 gram millimoles of peroxy oxygen per 100 grams of rubber present in said blend is employed and the heating of the blend is carried out during at least one of forming the blend and after the blend has been formed, and the heating temperature is at least 250° F.

4. The method according to claim 1 wherein component (3) contains at least one monovinyl substituted aromatic block which contains from about 90 to about 100 weight percent monovinyl substituted aromatic compound based on the total weight of monomers used in preparing that block, and at least one conjugated diene block which contains from about 50 to about 100 weight percent conjugated diene based on the total weight of monomers used in preparing that block.

5. The method according to claim 1 wherein component (2) is at least one of a homopolymer of butadiene, a random copolymer of butadiene and styrene, and a block copolymer of butadiene and styrene, and component (3) is at least one block copolymer of butadiene and styrene.

6. The method according to claim 5 wherein the rubber content of said blend is in the range of from about 5 to about 40 weight percent.

7. The method according to claim 1 wherein the conjugated dienes employed have from 4 to 10 carbon atoms per molecule, inclusive, and the monovinyl substituted aromatic compounds employed have from 8 to 12 carbon atoms per molecule, inclusive.

References Cited
UNITED STATES PATENTS

| 2,623,863 | 12/1952 | Dieckmann et al. | 260—892 XR |
| 3,129,199 | 4/1964 | Lunk | 260—880 |
| 3,231,635 | 1/1966 | Holden et al. | 260—876 XR |
| 3,251,905 | 5/1966 | Zelinski | 260—879 |
| 3,264,374 | 8/1966 | Jones | 260—880 |
| 3,264,375 | 8/1966 | Jones | 260—880 |

MURRAY TILLMAN, Primary Examiner

K. E. KUFFNER, Assistant Examiner

U.S. Cl. X.R.

260—892

UNITED STATES PATENT OFFICE
CERTIFICATE OF CORRECTION

Patent No. 3,476,829                          November 4, 1969

Jerry T. Gruver et al.

It is certified that error appears in the above identified patent and that said Letters Patent are hereby corrected as shown below:

Column 10, line 22, "thereby causing cross-linking to occur," should read -- ; --; line 24, after "material" insert -- thereby causing cross-linking to occur,".

Signed and sealed this 24th day of February 1970.

(SEAL)
Attest:

Edward M. Fletcher, Jr.                      WILLIAM E. SCHUYLER, JR.
Attesting Officer                               Commissioner of Patents